July 14, 1942.  J. Y. BLAZEK ET AL  2,289,694
GRINDER SUPPORT
Filed April 25, 1940  2 Sheets-Sheet 1

INVENTORS.
JOHN Y. BLAZEK
EDWARD McGOVERN
PAUL SCHRICK
BY Fay, Colvick, Williams & Fay
ATTORNEYS.

July 14, 1942.　　　J. Y. BLAZEK ET AL　　　2,289,694
GRINDER SUPPORT
Filed April 25, 1940　　　2 Sheets-Sheet 2

INVENTORS.
JOHN Y. BLAZEK
EDWARD McGOVERN
PAUL SCHRICK
BY
ATTORNEYS.

Patented July 14, 1942

2,289,694

UNITED STATES PATENT OFFICE 2,289,694

GRINDER SUPPORT

John Y. Blazek, Bedford, Ohio, and Edward McGovern and Paul Schrick, Newark, N. J., assignors to Lempco Products, Inc., Bedford, Ohio, a corporation of Ohio Application April 25, 1940, Serial No. 331,590

10 Claims. (Cl. 51—241)

This invention relates generally, as indicated, to a support for a grinder and has reference more specifically to means for supporting and guiding a crank pin grinder of the rotating pulley type.

In grinding crank pins with grinders of the type identified, difficulty has hitherto been experienced in producing parallelism of the crank pin axes.

The primary object of this invention has been, therefore, to produce a support and guide for a grinder of the type identified which will produce parallelism of the crank pin axes.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various forms in which the principle of the invention may be used.

In said annexed drawings, Fig. 1 is a plan view of a device embodying the preferred form of this invention mounted upon a motor block and in grinding relationship with a crank pin;

A device embodying this invention is secured to the bottom of the motor block and supports the grinder in grinding relation to a work pin of a crankshaft while the latter is assembled in the motor block.

Figure 1:
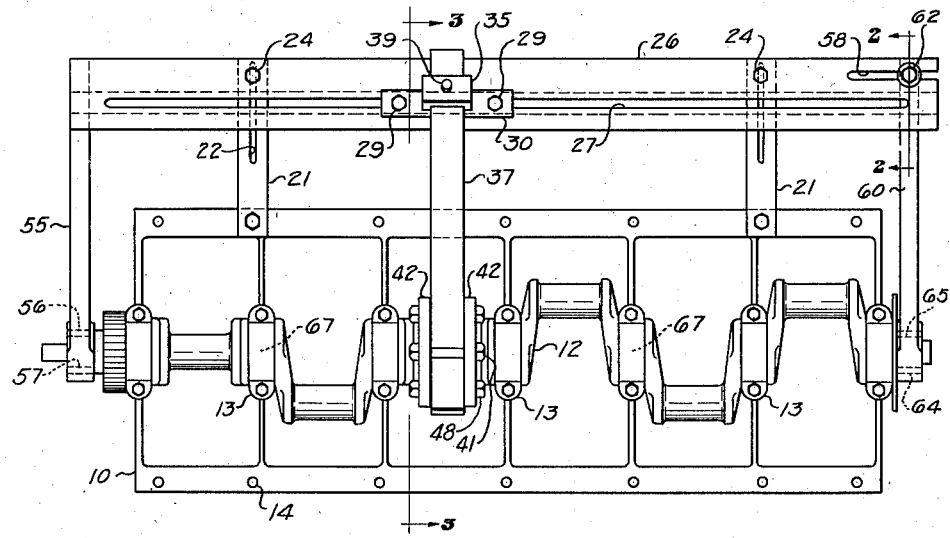
Figure 5:
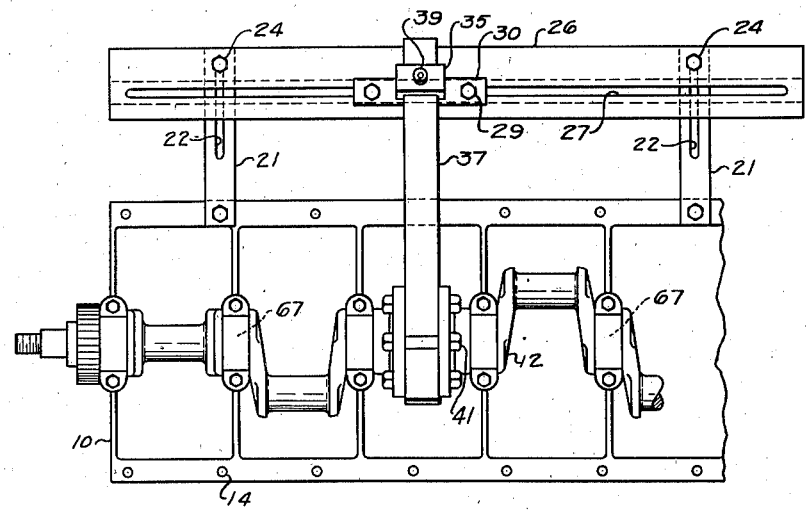
Fig. 5 is a plan view of a device embodying a modification of this invention.

In Figs. 1 and 5 there is seen a conventional type motor block 10 and a conventional crankshaft 12 which is maintained by bearing caps 13. A plurality of spaced threaded holes 14 are usually provided for maintaining an oil pan.

Figure 3:
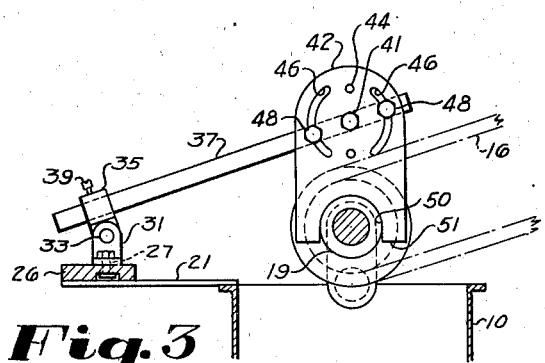
Fig. 3 is a section taken along the line 3—3 of Fig. 1.
Figure 4:
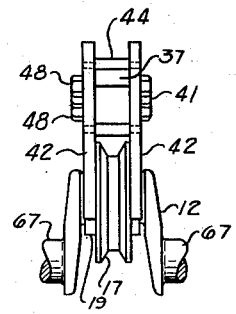
Fig. 4 is a fragmentary front view of Fig. 1.

The grinder, as is above indicated, is of the rotating pulley type and is best seen in Figs. 3 and 4. It comprises a split ring-like member adapted to be locked around a crank pin and rotated thereabout by means of a belt 16 which is accommodated by a peripheral groove 17 of the pulley. Abrasive strips extend along the inner periphery of the pulley so that as the belt 16 rotates the crank pin is ground. Crank pin grinders of this type are well known in the art, as is witnessed by Patent No. 2,179,465, issued Nov. 7, 1939, to J. Y. Blazek. The pulley is provided with a pair of coaxial flanges 19, the purpose of which will hereinafter appear.

Bolted to the motor block by means of bolts engaging the openings 14 is the pair of brackets 21 each of which is provided with a longitudinally extending slot 22. Suitably secured to the brackets, as by means of bolts 24, is an elongated beam 26 which is provided with a longitudinally extending T slot 27. Adjustable along the beam by suitable means, such as bolts 29 extending into the T-slots, is a slide 30 having a bifurcated extending projection 31. Extending into the bifurcation and pivotally carried thereby by means of pin 33 is a block 35 which is provided with a square aperture for slidingly accommodating an arm 37. A set screw 39 is provided for locking the arm 37. Pivotally carried by the arm 37 on either side thereof, by means of the bolt 41, is a pair of plates 42, which are rigidly inter-connected by spacers 44. Each of the plates is provided with arcuate slots 46, through which project bolts 48 for securing the plates in any desired pivotal position relatively to the arm 37. Each of the plates 42 is also provided with arcuate recesses 50 for accommodating the said flanges 19 of the grinder and the lower ends 51 of the plates extend downwardly below a diametral plane of the crank pin. It is thus seen that the radial end faces of the grinder and the flanges 19 are guided by and between the plates.

From the foregoing description it is apparent that since the arm 37 is perpendicular to the axis of the grinder and also is perpendicular to the slot 27 that the latter two are parallel. Thus the axis of the various crank pins will also be parallel. If therefore, the slot 27 is made parallel to the main axis of the crankshaft, then the axes of the various crank pins will be parallel to the said main axis. Means for so locating this slot will now be described.

Extending from one end of the beam 26, such as the left end of Fig. 1, is a locating arm 55 which is provided with a bore 56 for accommodating an insert 57, the inner diameter of which is adapted for engaging one of the bearing surfaces of the end of the crankshaft. The other end of the beam 26 is provided with a slot 58 which is parallel to the slot 27 and which accommodates an upwardly extending projection 59 of another locating arm 60. The latter is maintained in any desired adjusted position with respect to the beam by a bolt 62.

The arm 60 is, like arm 55, provided with a bore 64 which is coaxial with the bore 56, the axis of said bores being parallel to said slot 27. The bore 64 is adapted for receiving an insert 65, the inner diameter of which is adapted for engaging and centering itself relatively to a finished surface of the right-hand end of the crankshaft as seen in Fig. 1. Thus, by providing inserts for the bores 56 and 64 of various inner diameters a device embodying this invention may be readily oriented relatively to the crankshaft axis.

In operating a device incorporating this invention the proper inserts for the bores 56 and 64 are selected and thereby the bores are rendered coaxial with the crankshaft. The bolt 62 is then made secure, thereby properly locating the slot 27. The brackets 21 are secured to the motor block and the bolts 24 are tightened. Thus the beam 26 is rigidly spaced from and supported by the motor block. The grinder is then clamped about the crank pin which is to be ground and the plates 42 are swung into engagement with the grinder. The bolts 29, screw 39 and bolts 48 are then made secure, thus causing the axis of the grinder to assume and maintain its final position regardless of the deformation, wear and tear of the crank pin which is to be ground.

Figure 6:
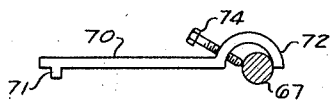
Fig. 6 is a side elevation of one of the elements used in conjunction with the modification.
Figure 2:
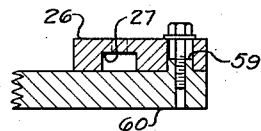
Fig. 2 is a fragmentary section taken on the line 2—2 of Fig. 1.

When the motor block may not be removed so that the ends of the crankshaft are not available for locating means, the modification illustrated in Figs. 5 and 6 are utilized. The operation of the preferred and alternative form is identical and the chief difference being the substitution of the element shown in Fig. 6 for both locating arms 55 and 60. In the alternative form the bearing caps are removed, thus exposing the main bearings 67 of the crankshaft. For locating the slot 27 there is provided an arm 70, see Fig. 6, which has a transversely extending projection 71 adapted for entering the recess 27. The other end 72 of the arm 70 is arcuate and freely fits over any of the said main bearings 67. A bolt 74 is provided for bringing the edge of the arcuate end 72 into contact with the main bearing, thus spacing the projection 71 from the axis of the main bearing. From the foregoing it will be seen that by means of the arm 70 engaging one main bearing and then another, the slot 27 may be located parallel to the axis of such bearings.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. The combination of a pulley-like grinding tool adapted for successively grinding crank pins of a crankshaft, a beam parallel to the axis of said crankshaft, a pair of arms extending from said beam and adapted for engaging the ends of said crankshaft, and another arm extending from said beam for guiding said grinding tool.

2. The combination of a pulley-like grinding tool adapted for successively grinding crank pins of a crankshaft, a beam extending parallel to the axis of said crankshaft, a pair of arms extending from said beam and adapted for engaging the ends of said crankshaft, and another arm extending from said beam for guiding said grinding tool, one end of said pair of arms being longitudinally adjustable relatively to said beam.

3. The combination of a pulley-like grinding tool adapted for successively grinding crank pins of a crankshaft while the latter is assembled in a motor block; a beam extending parallel to the axis of said crankshaft, an arm adapted for engaging said beam and locating the same parallel to said axis and adapted for engaging the main bearings of said crankshaft, bracket means secured to said motor block for supporting said beam, and means extending from said beam for guiding said grinding tool.

4. The combination of a pulley-like grinding tool adapted for encircling a crank pin of a crankshaft for grinding the same, means for limiting axial movement of said grinding tool, and means for locating said first-named means, said last-named means being adapted for engaging not more than one-half of a main bearing of said crankshaft while the latter is assembled in a motor block.

5. The combination of a pulley-like grinding tool adapted for grinding a crank-pin of a crankshaft and presenting radial faces, support means, plate means supported by said support means and in engagement with the radial faces of said tool, one of said means being provided with an arcuate slot and the other of said means being provided with a bolt projecting through said slot.

6. The combination of an element presenting a slideway substantially co-extensive in length with a crankshaft, a pair of brackets for interconnecting said element and a motor block so that said slideway is parallel to the axis of a crankshaft, a member slidable along said slideway, a block pivotally carried by said member grinding means for grinding said crankshaft, and an arm carried by said block and longitudinally adjustable relatively thereto for supporting said grinding means whereby all of the crank-pins of a crankshaft may be ground with but one setting of said element.

7. In a device of the character described for grinding the crank-pin of a crankshaft while the latter is assembled in a motor block, grinding means for grinding said crank-pin, an element presenting a slideway adapted to be disposed parallel to the axis of said crankshaft, means interconnecting said grinding means and said element, and an arm for locating said element having an arcuate recess adapted for engaging an exposed main bearing of said crankshaft while the latter is assembled in the motor block.

8. In a device for grinding crank-pins of a crankshaft while the latter is assembled in a motor block and the like, an element presenting a slideway, bracket means extending from said motor block for maintaining said slideway parallel to the axis of said crankshaft, a slide slidable along said slideway, a block presenting a guideway pivotally supported by said slide, means slidable along said guideway and a grinding tool for grinding the crank-pin guided by said last-named means.

9. The combination of a split pulley-like grinding tool, adapted for encircling a crankpin of a crankshaft for grinding the latter while the latter is assembled in a motor block and the like, a slideway supported by said motor block, a slide slidable along said slideway, a block pivotally carried by said slide, an arm carried by said last-named block and longitudinally adjustable relatively thereto, said tool presenting a radial bearing surface, said arm being in engagement with said surface for limiting axial movement of said tool.

10. The combination of a split pulley-like grinding tool adapted for encircling a crankpin of a crankshaft for grinding the latter while the latter is assembled in a motor block and the like, a slideway supported by said motor block, a slide slidable along said slideway, a block pivotally carried by said slide, an arm carried by said last-named block and longitudinally adjustable relatively thereto, said tool presenting a radial bearing surface, and a plate pivotally carried by said arm and in engagement with said surface for limiting axial movement of said tool.

JOHN Y. BLAZEK.
EDWARD McGOVERN.
PAUL SCHRICK.